United States Patent
Oguma et al.

(10) Patent No.: US 9,692,928 B2
(45) Date of Patent: Jun. 27, 2017

(54) NETWORK SYSTEM FOR RESOLVING IMAGE-FORMING-APPARATUS FIRMWARE AND APPLICATION VERSION CONFLICTS

(71) Applicant: Kyocera Document Solutions Inc., Osaka (JP)

(72) Inventors: Takashi Oguma, Osaka (JP); Masafumi Sato, Osaka (JP); Zhenyu Sun, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/054,156

(22) Filed: Feb. 26, 2016

(65) Prior Publication Data
US 2016/0255233 A1 Sep. 1, 2016

(30) Foreign Application Priority Data
Feb. 27, 2015 (JP) .................................. 2015-039566

(51) Int. Cl.
*H04N 1/00* (2006.01)
*G06F 9/445* (2006.01)
(Continued)

(52) U.S. Cl.
CPC ........... *H04N 1/00973* (2013.01); *G06F 8/65* (2013.01); *G06F 8/665* (2013.01); *G06K 15/402* (2013.01);
(Continued)

(58) Field of Classification Search
CPC .... G06F 3/1205; G06F 3/1228; G06F 3/1232; G06F 3/1247; G06F 3/126; G06F 3/1204;
(Continued)

(56) References Cited

U.S. PATENT DOCUMENTS 8,504,519 B1 * 8/2013 Sachs ........................ G06F 8/71
707/616
8,730,488 B2 * 5/2014 Kakitsuba ............. G06F 3/1204
358/1.13
(Continued)

FOREIGN PATENT DOCUMENTS

JP 2007-157014 A 6/2007

*Primary Examiner* — Negussie Worku
(74) *Attorney, Agent, or Firm* — James Judge (57) ABSTRACT

A program exchange system includes an exchange information managing server and a program exchange server. The exchange information managing server manages exchange information, the exchange information indicating a necessity to exchange at least one of a firmware program and an application program, corresponding to a combination of a version of the firmware program on an image forming apparatus and a version of the application program on the image forming apparatus. The program exchange server exchanges the program on the target image forming apparatus. The program exchange server determines the necessity to exchange the program on the target image forming apparatus based on the combination of the version of the firmware program on the target image forming apparatus and the version of the application program on the target image forming apparatus, and the exchange information managed by the exchange information managing server.

6 Claims, 6 Drawing Sheets

(51) Int. Cl.
   *G06K 15/00*      (2006.01)
   *H04N 1/32*       (2006.01)
(52) U.S. Cl.
   CPC ....... *G06K 15/408* (2013.01); *H04N 1/00244*
         (2013.01); *H04N 1/00344* (2013.01); *H04N*
            *1/32561* (2013.01); H04N 2201/0094
                                   (2013.01)
(58) Field of Classification Search
   CPC ...... G06F 3/1225; G06F 3/123; G06F 3/1287;
         G06F 3/1288; G06F 8/665; G06F 8/65;
         H04L 29/06; H04L 67/2804; H04L 67/28
   USPC ...... 358/1.15, 1.13, 1.9, 3.27; 709/223, 224,
            709/203, 208, 220, 201, 206, 217, 218,
            709/221, 242, 246; 399/24, 31, 8, 81, 9,
               399/11, 110, 26, 403, 404, 405, 43, 79
   See application file for complete search history.

(56) References Cited

U.S. PATENT DOCUMENTS

| | | | |
|---|---|---|---|
| 8,804,168 B2 * | 8/2014 | Nishikawa | G06F 8/65 358/1.13 |
| 9,058,236 B2 * | 6/2015 | Hirahara | G06F 8/65 |
| 9,348,578 B2 * | 5/2016 | Suwabe | G06F 8/65 |
| 9,372,647 B2 * | 6/2016 | Nakajima | G06F 3/1222 |
| 9,544,450 B2 * | 1/2017 | Tsuruoka | H04N 1/00973 |
| 9,619,221 B2 * | 4/2017 | Nishikawa | G06F 8/65 |
| 2007/0005845 A1 * | 1/2007 | Abe | G03G 15/50 710/62 |
| 2007/0067373 A1 * | 3/2007 | Higgins | G06F 11/3013 |
| 2007/0169104 A1 * | 7/2007 | Morita | G06F 8/65 717/170 |
| 2008/0225337 A1 * | 9/2008 | Yano | G06F 21/10 358/1.16 |
| 2009/0177806 A1 * | 7/2009 | Nishikawa | G06F 8/65 710/10 |
| 2009/0228716 A1 * | 9/2009 | Poston | G06F 21/6209 713/189 |
| 2014/0068597 A1 * | 3/2014 | Hirahara | G06F 8/65 717/173 |
| 2015/0234648 A1 * | 8/2015 | Shinoda | G06F 8/665 717/172 |
| 2016/0196130 A1 * | 7/2016 | Shimizu | G06F 8/65 717/168 |
| 2016/0335414 A1 * | 11/2016 | Isaacs | G06N 5/022 |

* cited by examiner

```
<issue>
<model>
<fw_version>ANY</fw_version>
<emb_version>5.1.6</emb_version>
<affected_function>
<function>PULL_PRINT</function>
<function>EASY_SCAN</function>
</affected_function>
<fix>
<upgrade>EMB_TERMINAL</upgrade>
<version>5.1.7</version>
</fix>
</issue>
```

NETWORK SYSTEM FOR RESOLVING IMAGE-FORMING-APPARATUS FIRMWARE AND APPLICATION VERSION CONFLICTS

INCORPORATION BY REFERENCE

This application is based upon, and claims the benefit of priority from, corresponding Japanese Patent Application No. 2015-039566 filed in the Japan Patent Office on Feb. 27, 2015, the entire contents of which are incorporated herein by reference.

BACKGROUND

Unless otherwise indicated herein, the description in this section is not prior art to the claims in this application and is not admitted to be prior art by inclusion in this section.

As a program exchange system that exchanges a program on an image forming apparatus, there is known a program exchange system that upgrades a firmware on the image forming apparatus. When the firmware on the image forming apparatus is upgraded, the program exchange system informs that there is a possibility that a malfunction occurs because the version of an application program on the image forming apparatus is old.

SUMMARY

A program exchange system according to one aspect of the disclosure includes an image forming apparatus that is connected to a first local area network (LAN); a version acquiring server that is connected to the first LAN, and is configured of a computer; an exchange information managing server that is connected to a second LAN, and is configured of one or more computers; and a program exchange server that is connected to a third LAN, and is configured of one or more computers; and an Internet that is connected to the first LAN, the second LAN, and the third LAN. The version acquiring server acquires from the image forming apparatus a version of a firmware program on the image forming apparatus and a version of an application program on the image forming apparatus. The exchange information managing server stores exchange information input from outside via the Internet. The exchange information i) indicates a necessity to exchange at least one of the firmware program on the image forming apparatus and the application program on the image forming apparatus, and ii) is stored each corresponding to a combination of the version of the firmware program and the version of the application program. The program exchange server i) acquires from the exchange information managing server the exchange information via the Internet, ii) acquires from the version acquiring sever the version of the firmware program and the version of the application program via the Internet, iii) determines the necessity to exchange at least one of the firmware program and the application program, based on the acquired exchange information and the combination of the acquired version of the firmware program and the acquired version of the application program, and iv) exchanges at least one of the firmware program and the application program, when determining there is the necessity to exchange.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure using the drawings.

First, a configuration of a program exchange system according to the embodiment will be described.

Figure 1:
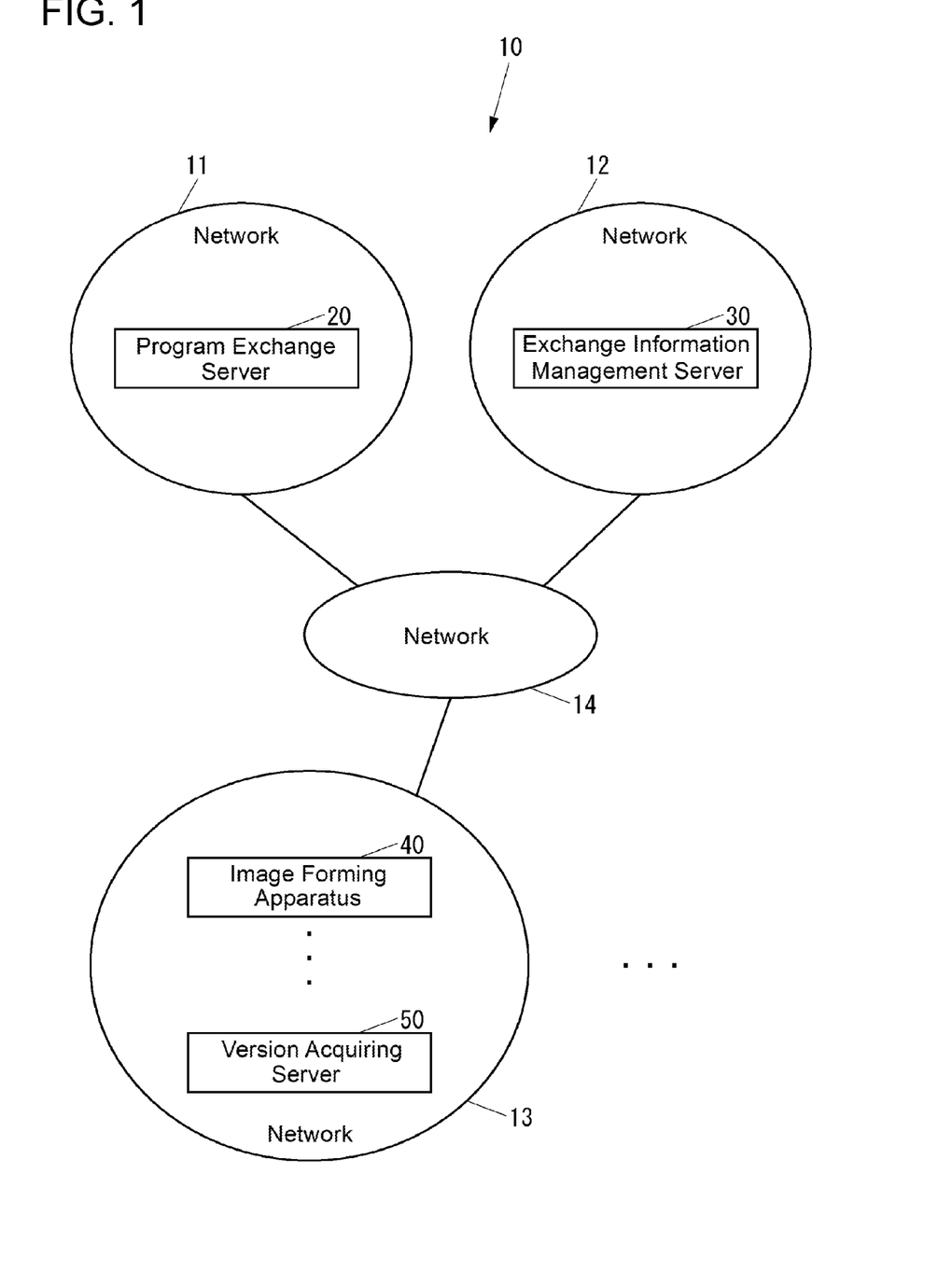
FIG. 1 illustrates a block configuration of a program exchange system according to one embodiment of the disclosure.

FIG. 1 illustrates a program exchange system 10 according to the embodiment.

As illustrated in FIG. 1, the program exchange system 10 includes a network 11 such as a local area network (LAN), a network 12 such as a LAN, a network 13 such as a LAN, and a network 14, such as the Internet, that connects among many networks, which are similar to the network 13 (not illustrated), the network 11, and the network 13. The network 14 also connects with the many networks, which are similar to the network 13 (not illustrated), and the network 11. The network 14 also connects with the network 11 and the network 12.

On the network 11, a program exchange server 20, which exchanges a program on a target image forming apparatus, is arranged.

The program exchange server 20 is, for example, configured of one or more computers such as a personal computer (PC).

On the network 12, an exchange information management server 30 is arranged. The exchange information management server 30 manages exchange information, which indicates a necessity to exchange at least one of a firmware program and an application program, corresponding to a combination of a version of the firmware program on the image forming apparatus and a version of the application program on the image forming apparatus.

The exchange information management server 30 is, for example, configured of one or more computers such as a PC.

On the network 13, an image forming apparatus 40 and a version acquiring server 50 are arranged. The version acquiring server 50 acquires a version of a program on an image forming apparatus included in the network 13, such as the image forming apparatus 40.

On the network 13, many image forming apparatuses in addition to the image forming apparatus 40 are arranged. However, for ease of understanding, descriptions of the image forming apparatuses other than the image forming apparatus 40 are omitted below.

The image forming apparatus 40 is, for example, a multifunction peripheral (MFP) or a printer-only machine.

The version acquiring server 50 is, for example, configured of a computer such as a PC.

Among the networks of the program exchange system 10, a type of devices arranged on the many networks, which are similar to the network 13 (not illustrated), is similar to a type of devices arranged on the network 13. For ease of understanding, among the networks of the program exchange system 10, descriptions of the many networks, which are similar to the network 13 (not illustrated), are omitted below.

Figure 2:
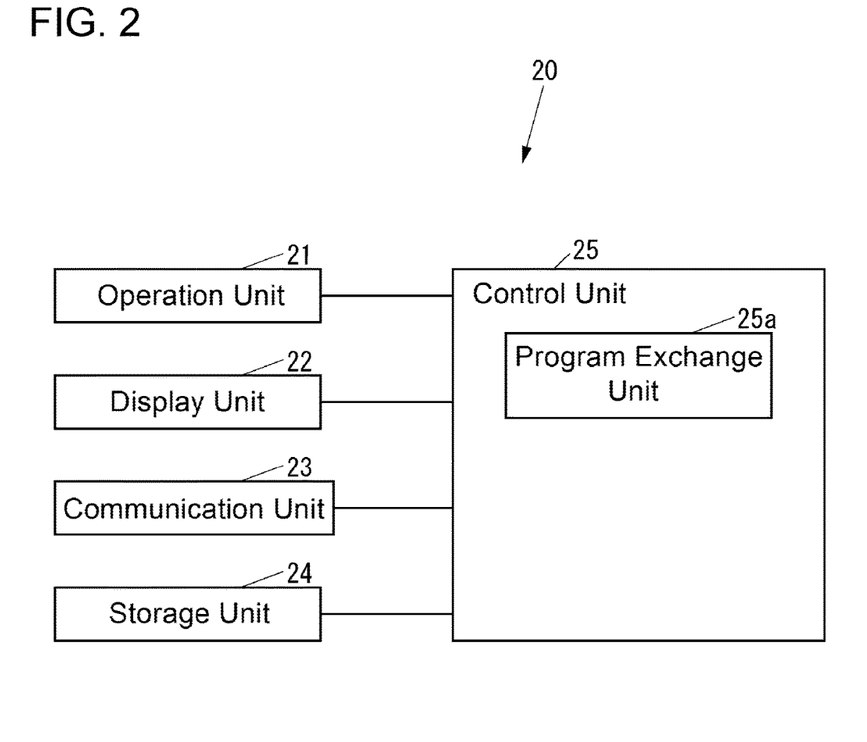
FIG. 2 illustrates a block configuration of a program exchange server according to the one embodiment.

FIG. 2 illustrates the program exchange server 20.

As illustrated in FIG. 2, the program exchange server 20 includes an operation unit 21, a display unit 22, a communication unit 23, a storage unit 24, and a control unit 25. The operation unit 21 is an input device, such as a computer mouse and a keyboard, where various kinds of operations by a user are input. The display unit 22 is a display device, such as a liquid crystal display (LCD), that displays various pieces of information. The communication unit 23 is a communication device that communicates with an external device. The storage unit 24 is a storage device, such as a hard disk drive (HDD), that stores various data. The control unit 25 controls the entire program exchange server 20.

The control unit 25 includes, for example, a central processing unit (CPU), a read only memory (ROM), which stores programs and various data, and a random access memory (RAM), which is used as a work area of the CPU. The CPU runs programs stored in the ROM or the storage unit 24.

The control unit 25 functions as a program exchange unit 25a, which exchanges a program on the target image forming apparatus, by running the programs stored in the ROM or the storage unit 24.

Figure 3:
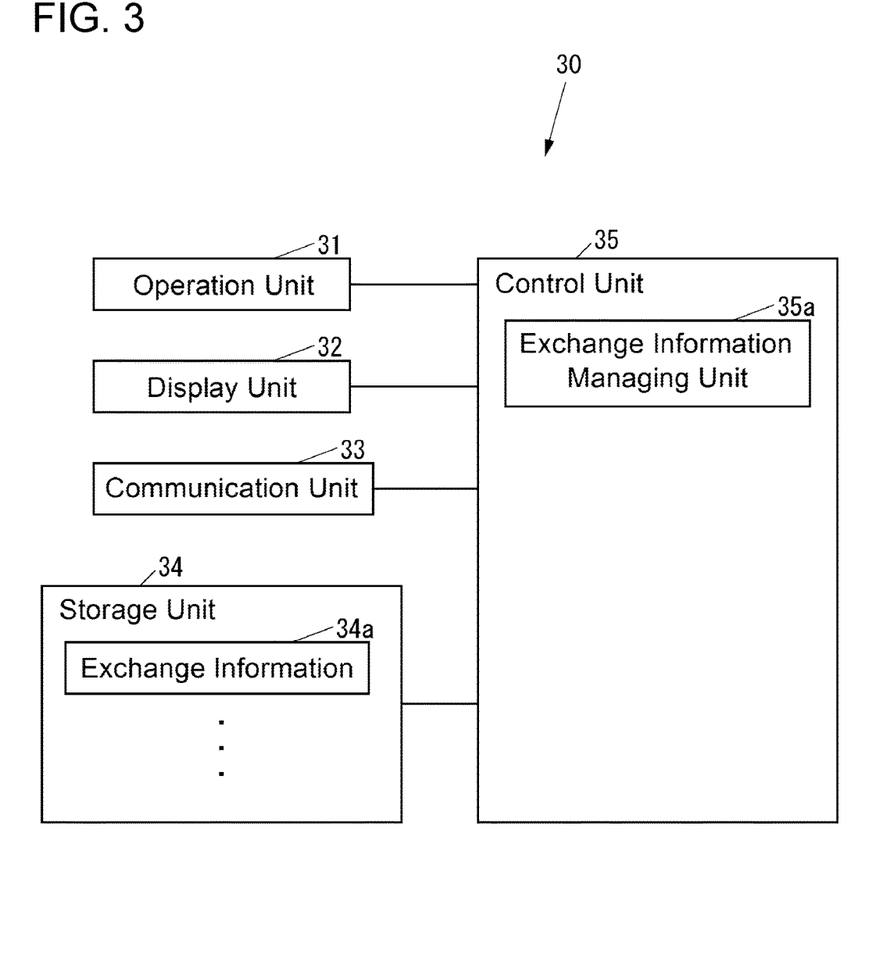
FIG. 3 illustrates a block configuration of an exchange information management server according to the one embodiment.

FIG. 3 illustrates the exchange information management server 30.

As illustrated in FIG. 3, the exchange information management server 30 includes an operation unit 31, a display unit 32, a communication unit 33, a storage unit 34, and a control unit 35. The operation unit 31 is an input device, such as a computer mouse and a keyboard, where various kinds of operations by a user are input. The display unit 32 is a display device, such as an LCD, that displays various pieces of information. The communication unit 33 is a communication device that communicates with an external device. The storage unit 34 is a storage device, such as an HDD, that stores various data. The control unit 35 controls the entire exchange information management server 30.

The storage unit 34 can store exchange information 34a for each of combinations of the version of the firmware programs and the version of the application programs.

Figure 4:
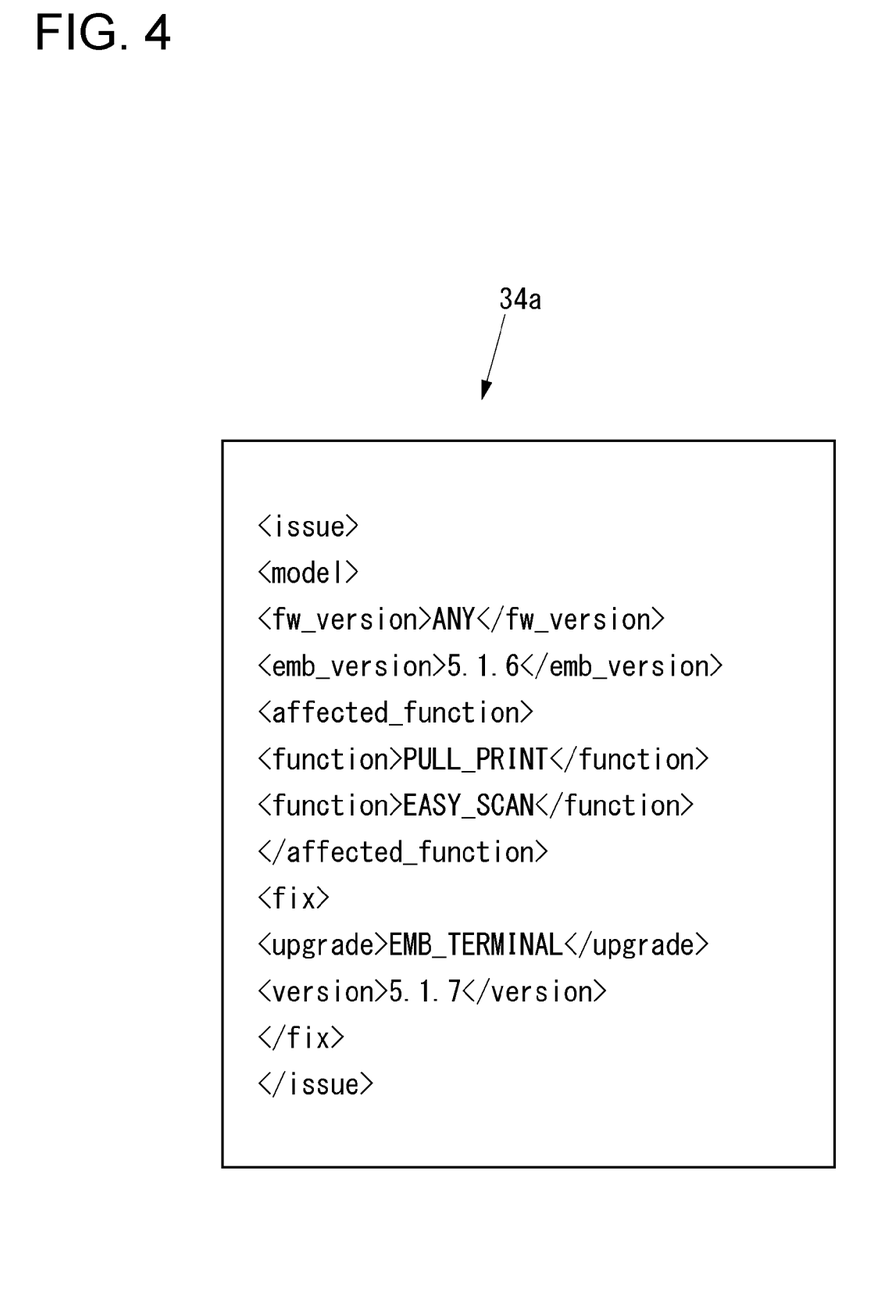
FIG. 4 illustrates exemplary exchange information according to the one embodiment.

FIG. 4 illustrates exemplary exchange information 34a.

In the exchange information 34a illustrated in FIG. 4, the third line indicates that the firmware program is a target for any (specified as ANY) of the versions of the firmware program (fw_version). The fourth line indicates that the application program is a target if the version of the application program (emb_version) is 5.1.6.

From the fifth line to the eighth line indicates that a problem occurs when using at least one of a function of a pull print (PULL_PRINT), which prints after acquiring print data stored in a server from the image forming apparatus, and a function of an easy scan (EASY_SCAN), which reads image data by a scanner corresponding to a setting of a reading set in advance.

From the ninth line to the twelfth line indicates that the upgrade of the version of the application program (EMB_TERMINAL) to 5.1.7 is a solution.

The exchange information 34a, illustrated in FIG. 4, indicates that the upgrade of the version of the application program is a solution. However, the exchange information 34a may indicate that the downgrade of the version of the application program is a solution. Instead of an exchange of the application program, or in addition to the exchange of the application program, the exchange information 34a may indicate that the exchange of the firmware program is a solution. For an exchange of the firmware program, as well as the exchange of the application program, to upgrade is possible, and to downgrade is also possible.

The control unit 35, illustrated in FIG. 3, includes, for example, a CPU, a ROM, which stores programs and various data, and a RAM, which is used as a work area of the CPU. The CPU runs programs stored in the ROM or the storage unit 34.

The control unit 35 functions as an exchange information managing unit 35a, which manages exchange information, by running the programs stored in the ROM or the storage unit 34.

For example, if a problem has occurred in image forming apparatuses on the market due to a combination of firmware version and application program version, a service person of a manufacturer of the image forming apparatus can input the exchange information 34a corresponding to this problem into the exchange information management server 30 via the network 14 from throughout the world. Accordingly, the exchange information managing unit 35a causes the storage unit 34 to store the externally input exchange information 34a.

Figure 5:
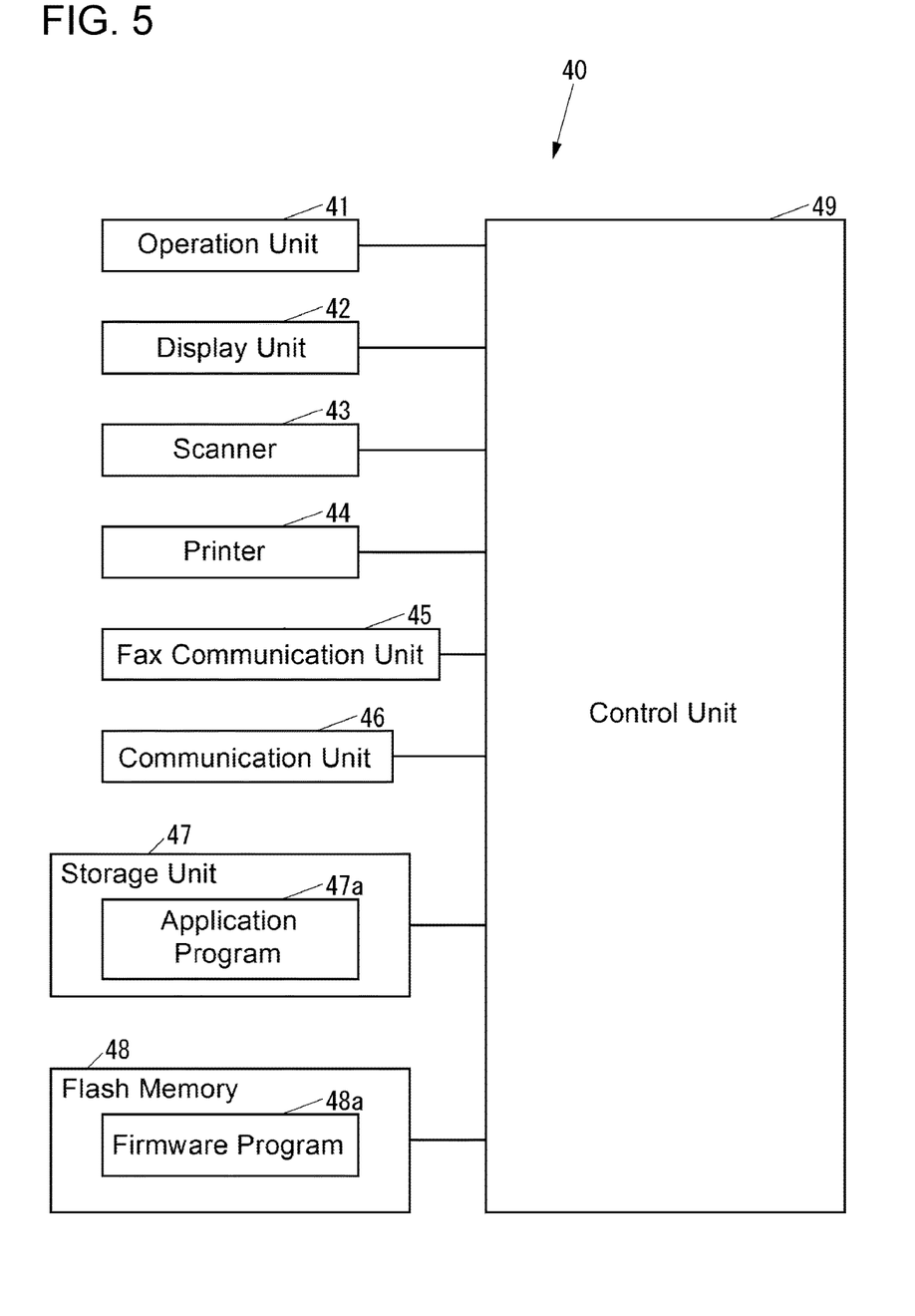
FIG. 5 illustrates a block configuration of an image forming apparatus according to the one embodiment.

FIG. 5 illustrates the image forming apparatus 40.

As illustrated in FIG. 5, the image forming apparatus 40 includes an operation unit 41, a display unit 42, a scanner 43, a printer 44, a fax communication unit 45, a communication unit 46, a storage unit 47, a flash memory 48, and a control unit 49. The operation unit 41 is an input device such as a button where various kinds of operations by a user are input. The display unit 42 is a display device, such as an LCD, that displays various pieces of information. The scanner 43 is a reading device that reads image data from an original document. The printer 44 is a print device that prints on a recording medium, such as a paper sheet. The fax communication unit 45 is a fax device that executes fax communication with an external facsimile device (not illustrated) via a communication line such as a dial-up line. The communication unit 46 is a communication device that communicates with an external device via the network 11. The storage unit 47 is a storage device, such as an electrically erasable programmable read only memory (EEPROM) or an HDD that stores various data. The control unit 49 controls the entire image forming apparatus 40.

The storage unit 47 can store an application program 47a for the image forming apparatus 40.

The flash memory 48 can store a firmware program 48a for the image forming apparatus 40.

The control unit 49 includes, for example, a CPU, a ROM, which stores programs and various data, and a RAM used as a work area of the CPU. The CPU runs programs stored in the ROM or the storage unit 47.

Next, the operation of the program exchange system 10 will be described.

Figure 6:
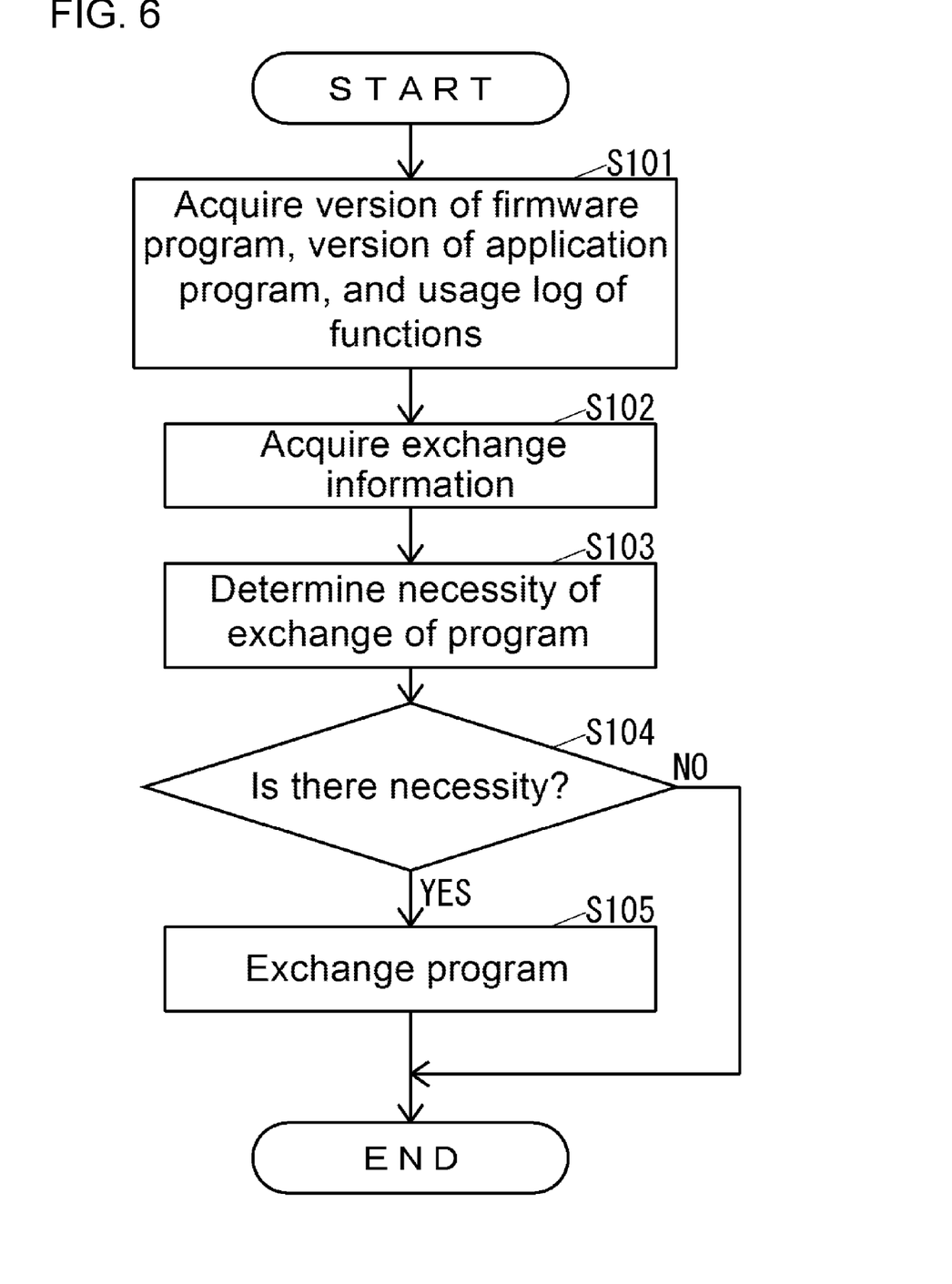
FIG. 6 illustrates a flowchart of operations of the program exchange server according to the one embodiment.

The program exchange server 20 executes operations illustrated in FIG. 6 when an exchange of a program on the image forming apparatus 40 is instructed via the operation unit 21 or the communication unit 23.

FIG. 6 illustrates operations of the program exchange server 20.

As illustrated in FIG. 6, the program exchange unit 25a of the program exchange server 20 acquires a version of the firmware program 48a on the image forming apparatus 40, a version of the application program 47a on the image forming apparatus 40, and a usage log of functions on the image forming apparatus 40, from the version acquiring server 50 (Step S101).

Next, the program exchange unit 25a acquires the exchange information 34a managed by the exchange information management server 30 (Step S102).

Next, the program exchange unit 25a determines a necessity of the exchange of the program on the image forming apparatus 40 based on: the combination of the version of the firmware program 48a and the version of the application program 47a acquired at Step S101, the usage log acquired at Step S101, and the exchange information 34a acquired at Step S102 (Step S103). For example, when the exchange information 34a acquired at Step S102 is the exchange information 34a illustrated in FIG. 4, the program exchange unit 25a determines that there is no necessity to exchange the program if the version of the application program 47a acquired at Step S101 is not 5.1.6. Even when the exchange information 34a acquired at Step S102 is the exchange information 34a illustrated in FIG. 4, and the version of the application program 47a acquired at Step S101 is 5.1.6, the program exchange unit 25a determines that there is no necessity to exchange the program if the usage of any function of the pull print and the easy scan is not included in the usage log acquired at Step S101. On the other hand, when the exchange information 34a acquired at Step S102 is the exchange information 34a illustrated in FIG. 4, and the version of the application program 47a acquired at Step S101 is 5.1.6, the program exchange unit 25a determines that there is a necessity to exchange the program if the usage of any function of the pull print and the easy scan is included in the usage log acquired at Step S101.

Then, the program exchange unit 25a determines whether or not the program exchange unit 25a determines there is a necessity to exchange the program on the image forming apparatus 40 at Step S103 (Step S104).

If the program exchange unit 25a determines that the program exchange unit 25a has determined, at Step S104, that there is a necessity to exchange the program on the image forming apparatus 40, the program exchange unit 25a exchanges the program on the image forming apparatus 40 in an exchange method indicated in the exchange information 34a (Step S105), and terminates the operations illustrated in FIG. 6. For example, when the exchange information 34a acquired at Step S102 is the exchange information 34a illustrated in FIG. 4, and the version of the application program 47a acquired at Step S101 is 5.1.6, the program exchange unit 25a upgrades the version of the application program 47a on the image forming apparatus 40 to 5.1.7 if the usage of any function of the pull print and the easy scan is included in the usage log acquired at Step S101.

When the program exchange unit 25a determines that the program exchange unit 25a has determined, at Step S104, that there is no necessity to exchange the program on the image forming apparatus 40, the program exchange unit 25a terminates the operations illustrated in FIG. 6 without executing the process at Step S105

As described above, since the program exchange system 10 determines the necessity to exchange of at least one of the firmware program 48a and the application program 47a on the image forming apparatus 40 based on the combination of the version of the firmware program 48a on the image forming apparatus 40 and the version of the application program 47a on the image forming apparatus 40, and the exchange information 34a, the program exchange system 10 can determine whether or not the program on the image forming apparatus 40 should be exchanged. Accordingly, the program exchange system 10 can exchange the program on the image forming apparatus 40 only when there is a necessity to exchange the program on the image forming apparatus 40.

Since the program exchange system 10 determines the necessity to exchange at least one of the firmware program 48a and the application program 47a on the image forming apparatus 40 based on not only the combination of the version of the firmware program 48a on the image forming apparatus 40 and the version of the application program 47a on the image forming apparatus 40, but also the usage log of specific functions on the image forming apparatus 40, the program exchange system 10 can determine more appropriately whether or not the program on the image forming apparatus 40 should be exchanged.

The program exchange system 10 may replace a program on the image forming apparatus 40 without doing so on the basis of the usage log of functions on the image forming apparatus 40. For example, in a case where the combination of the version of the firmware 48a on the image forming apparatus 40 and the version of the application program 47a on the image forming apparatus 40 creates a security hole, the program exchange system 10 may replace the program on the image forming apparatus 40 without doing so on the basis of the usage log of functions on the image forming apparatus 40.

The program exchange server 20 and the exchange information management server 30 may be configured of an identical computer.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A program exchanging system, comprising:
    at least one image forming apparatus connected to an Internet-connected local area network (LAN), the image forming apparatus having a memory storing a given version of firmware for operation of the image forming apparatus and an application storage storing a given version of at least one application program for operation of the image forming apparatus, and maintaining a usage log of specific functions of the image forming apparatus;
    a first computer configured as a version acquiring server and connected to the LAN, for acquiring over the LAN, from the at least one image forming apparatus, the given versions of the firmware and the at least one application program, and the usage log;

an Internet-connected second computer configured as an exchange information managing server, and including an exchange-information storage storing exchange information externally input via the Internet by a service person of a manufacturer of the image forming apparatus, the exchange information i) indicating necessity to replace at least one of the given versions of either the firmware or the at least one application program, and ii) being stored in combinations of given version of firmware and corresponding given version of application program, and including a solution to either upgrade or downgrade the given versions of either the firmware or the at least one application program, the solution being to problems occurring in image forming apparatuses on the market due to combinations of firmware version and application program version, and a computer central processing unit programmed to function as an exchange information managing unit for causing the exchange-information storage to store the exchange information externally input via the Internet; and an Internet-connected third computer configured as a program exchange server for i) acquiring the exchange information from the exchange information managing server via the Internet, ii) acquiring the given versions of the firmware and the at least one application program, and the usage log, from the version acquiring sever via the Internet, iii) determining necessity to replace at least one of the given versions of either the firmware or the at least one application program, based on the acquired exchange information, on the combinations of given version of firmware and corresponding given version of application program, and on the usage log, and iv) replacing at least one of the given versions of either the firmware or the at least one application program when the program exchange server determines there is a necessity to exchange versions of either the firmware or the at least one application program.

2. The program exchanging system according to claim 1, wherein the program-exchange-server-configured third computer is therein further for replacing at least one of the given versions of either the firmware or the at least one application program irrespective of the usage log, in a case where the combination of given version of firmware program and corresponding given version of application program creates a security hole.

3. A program exchanging method by a program exchanging system, the program exchanging system including: i) at least one image forming apparatus connected to an Internet-connected local area network (LAN), the image forming apparatus having a memory storing a given version of firmware for operation of the image forming apparatus and an application storage storing a given version of at least one application program for operation of the image forming apparatus, and maintaining a usage log of specific functions of the image forming apparatus; ii) a first computer configured as a version acquiring server and connected to the LAN; iii) an Internet-connected second computer configured as an exchange information managing server, and including an exchange-information storage; and iv) an Internet-connected third computer configured as a program exchange server; the program exchanging method comprising:

via the version acquiring server, acquiring over the LAN, from the at least one image forming apparatus the given versions of the firmware and the at least one application program, and the usage log;

via the exchange information managing server, storing exchange information into the exchange-information storage, the exchange information externally input via the Internet by a service person of a manufacturer of the image forming apparatus, and indicating i) necessity to replace at least one of the given versions of either the firmware or the at least one application program, and ii) being stored in combinations of given version of firmware and corresponding given version of application program, and including a solution to either upgrade or downgrade the given versions of either the firmware or the at least one application program, the solution being to problems occurring in image forming apparatuses on the market due to combinations of firmware version and application program version; and via the program exchange server,
acquiring the exchange information from the exchange information managing server via the Internet,
acquiring the given versions of the firmware and of the at least one application program, and the usage log, from the version acquiring sever via the Internet,
determining necessity to replace at least one of the given versions of either the firmware or the at least one application program, based on the acquired exchange information, on the combinations of given version of firmware and corresponding given version of application program, and on the usage log, and
replacing at least one of the given versions of either the firmware or the at least one application program when the determining the via the program exchange server determines there is a necessity to exchange versions of either the firmware or the at least one application program.

4. The program exchanging method according to claim 3 further comprising via the program exchange server, replacing at least one of the given versions of either the firmware or the at least one application program irrespective of the usage log, in a case where the combination of given version of firmware program and corresponding given version of application program creates a security hole.

5. A non-transitory computer-readable recording medium storing a program for controlling a program exchanging system, the program exchanging system including: i) at least one image forming apparatus connected to an Internet-connected local area network (LAN), the image forming apparatus having a memory storing a given version of firmware for operation of the image forming apparatus and an application storage storing a given version of at least one application program for operation of the image forming apparatus, and maintaining a usage log of specific functions of the image forming apparatus; ii) a first computer configured as a version acquiring server and connected to the LAN; iii) an Internet-connected second computer configured as an exchange information managing server, and including an exchange-information storage; and iv) an Internet-connected third computer configured as a program exchange server; the program-exchanging program causing the program exchanging system to execute steps of:

the version acquiring server acquiring over the LAN, from the at least one image forming apparatus the given versions of the firmware and the at least one application program, and the usage log;

the exchange information managing server storing exchange information into the exchange-information storage, the exchange information externally input via the Internet by a service person of a manufacturer of the image forming apparatus, the exchange information i) indicating necessity to replace at least one of the given versions of either the firmware or the at least one application program, and ii) being stored in combinations of given version of firmware program and corresponding given version of application program; and the program exchange server i) acquiring the exchange information from the exchange information managing server via the Internet, ii) acquiring the given versions of the firmware and the at least one application program, and the usage log, from the version acquiring sever via the Internet, iii) determining necessity to replace at least one of the given versions of either the firmware or the at least one application program, based on the acquired exchange information, on the combinations of given version of firmware and corresponding given version of application program, and on the usage log, and iv) replacing at least one of the given versions of either the firmware or the at least one application program when the determining the via the program exchange server determines there is a necessity to exchange versions of either the firmware or the at least one application program.

6. The non-transitory computer-readable recording medium according to claim 5, wherein the program-exchanging program causes the program exchanging system to execute a further step of via the program exchange server, replacing at least one of the given versions of either the firmware or the at least one application program irrespective of the usage log, in a case where the combination of given version of firmware program and corresponding given version of application program creates a security hole.

* * * * *